United States Patent [19]

Goransson et al.

[11] 4,113,450
[45] Sep. 12, 1978

[54] METHOD AND DEVICE RELATING TO SEPARATION OF LIQUID FROM LIQUID-CONTAINING COMPRESSED GAS

[75] Inventors: Lars Roland Goransson, Berchem, Belgium; Gosewinus Franciscus van Oorschot, Breda, Netherlands; Jan Gustaaf Pittoors, Boechout, Belgium

[73] Assignee: Atlas Copco Aktiebolag, Nacka, Sweden

[21] Appl. No.: 750,835

[22] Filed: Dec. 15, 1976

[30] Foreign Application Priority Data

Dec. 23, 1975 [SE] Sweden .......................... 146514/75

[51] Int. Cl.² ............................................ B01D 45/16
[52] U.S. Cl. ........................................ 55/97; 55/337; 55/459 R; 55/DIG. 25

[58] Field of Search .................... 210/73 R, 304, 311, 210/312, 512; 55/97, 320, 332, 337, 459, 218

[56] References Cited

U.S. PATENT DOCUMENTS

| 3,507,098 | 4/1970 | Veres et al. ................... 210/304 X |
| 3,543,542 | 12/1970 | Bochan .......................... 210/304 X |
| 3,931,011 | 1/1976 | Richards et al. ............... 210/304 X |

Primary Examiner—William A. Cuchlinski, Jr.
Attorney, Agent, or Firm—Eric Y. Munson

[57] ABSTRACT

A method and a device related to separating liquid from liquid-containing compressed gas in a two-stage liquid separator are disclosed. According to the invention, separated and collected liquid containing a large amount of small gas bubbles is automatically prevented from reaching a filter unit in the separator when the pressure at the filter unit decreases.

7 Claims, 7 Drawing Figures

METHOD AND DEVICE RELATING TO SEPARATION OF LIQUID FROM LIQUID-CONTAINING COMPRESSED GAS

BACKGROUND OF THE INVENTION

The present invention concerns a method and a device related to separating liquid from liquid-containing compressed gas in a two-stage liquid separator.

When separating liquid from liquid-containing compressed gas, as for example compressed in a liquid injected screw compressor, a two-stage method is frequently used. The compressed gas is in this method introduced into a first separator stage comprising a cyclone separator, where 90% or more of the liquid is separated. The separated liquid is collected below the cyclone separator. The compressed gas is then conducted to a second separator stage, comprising a filter, for separation of substantially all the remaining liquid.

In order to make maintenance of the compressor, which is supplied with injection liquid from the pressurized liquid separator, possible, the pressure in the liquid separator is lowered when the compressor is stopped. Since the liquid separated and collected in the liquid separator contains a large amount of very small gas bubbles under pressure and which only slowly leave the liquid, a considerable expansion of the liquid-gas mixture is obtained when the pressure is lowered. There is a great risk at this moment that hot liquid, around 100° C, is ejected through the pressure decreasing valve. Furthermore, there is an even greater risk that the filter of the second stage is filled with liquid, with the result that a completely unacceptable amount of liquid is carried along with the compressed gas when the compressor is restarted. Since the volume of the gas bubbles is inversely proportional to the pressure, the above mentioned problem increases when the delivered pressure of the gas is increased.

SUMMARY OF THE INVENTION

According to the present invention, which is defined in the appended claims, the above mentioned problem is solved through automatically preventing the collected liquid from reaching the filter unit when the pressure at the filter unit is lowered. This is done by means of a valve situated between the collected liquid and the filter unit and which is controlled by the pressure difference across the valve.

According to an advantageous embodiment of the invention a narrow channel is arranged between the liquid collecting part and the filter unit so that the pressure in the liquid collecting part is allowed to decrease slowly when the above mentioned valve has been shut. In this way the liquid collecting part is also depressurized without having unacceptable amounts of liquid leaving the system.

BRIEF DESCRIPTION OF THE DRAWING

Some embodiments of the invention are described below with reference to the accompanying drawings in which.

DESCRIPTION OF A PREFERRED EMBODIMENT AND MODIFICATION

Figure 1:
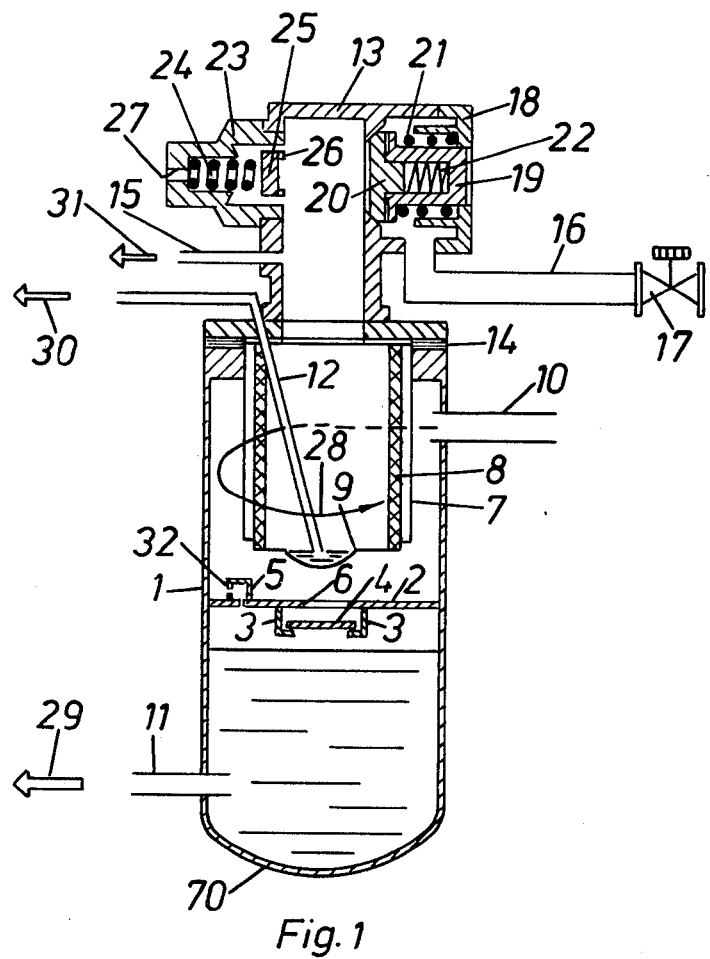
FIG. 1 shows a two-stage liquid separator incorporating the invention.

The liquid separator shown in FIG. 1 is intended for separating oil from an oil-gas mixture which has been compressed in a compressor, for example a liquid injected screw compressor. The compressed oil-gas mixture is introduced eccentrically into a pressure container 1 through conduit 10 as indicated by the arrow 28. The container 1 thus acts as a cyclone separator where more than 90% of the oil is separated from the oil-gas mixture. The second separator stage comprises a filter unit 8 where substantially all the remaining oil is separated from the oil-gas mixture. The compressed gas is then delivered through a minimum pressure valve 20 to a delivery conduit 16 having a shut-off valve 17. The filter unit 8 is surrounded by a shield 7 in order to prevent the incoming oil-gas mixture from coming into direct contact with the filter unit 8. The lower part of container 1 is used as an oil reservoir where oil separated in the first separator stage is collected on liquid collecting means 70. The upper part of the container is used for storing compressed gas. For this purpose a seal 14 and a head piece 13 are mounted on the top of the container 1. In order to assure that no gas is delivered until a certain minimum pressure exists in the container, a minimum pressure valve is provided which comprises a valve element 20 guided by a sleeve 19 and loaded by a spring 22. The sleeve 19 is held in place by a cover 18 and a spring 21.

During normal operation of the compressor, oil is delivered to the compressor through conduit 11 as indicated by the arrow 29. Oil separated in the filter unit 8 is collected on the bottom 9 of the unit and drawn through conduit 12 back to the compressor as indicated by the arrow 30. This flow is preferably mixed with the oil coming through conduit 11. Furthermore, there is provided a conduit 15 through which compressed gas can be taken out for control purposes as indicated by the arrow 31. Since the gas is taken out in order to actuate certain control devices, a minimum flow capacity is required in order to obtain a satisfactory control function. This means that the pressure in the container 1 decreases rather rapidly when the compressor is shut off. In this way the above mentioned problem with expanding gas bubbles arises.

The container 1 is provided with wall means 2 below which all or at least substantially all the oil is situated. The wall 2 is provided with a hole 6 through which oil separated in the first separator stage can enter the lower part of the container. A valve plate 4 rests during normal operation on supports 3 mounted on the wall 2 or on a separate plate connected with the wall. The supports 3 are made such that they do not restrict the downwards oil-flow. When the compressor is shut off, the pressure falls in the upper part of the container. As a result of this, the valve plate 4 automatically rises because of the pressure difference across it and closes the hole 6. In this way the oil containing a large amount of gas bubbles is automatically prevented from expanding into the upper part of the container 1. In order to slowly depressurize and thus degasify the oil, the wall 2 is provided with a tube 5 which is closed at one end and has bleeder hole 32 which is directed away from the filter unit 8. The size of this hole has been exaggerated in FIGS. 1 and 2 for better clarity. The head piece 13 is provided with a valve housing 23 having a hole 27. The valve housing carries a valve plate 25 loaded by a spring 24 and is furthermore provided with motion restriction means 26. This valve is always closed when the pressure in the container exceeds the ambient pressure by a certain value which is substantially lower than the delivery pressure. This valve is provided for making the pressure in the container equal to the ambient pressure after the compressor has been stopped.

Figure 2:
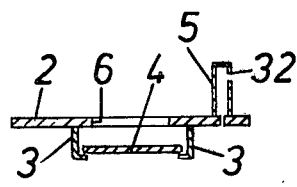
FIGS. 2-7 show a number of alternative designs of a detail of FIG. 1.
Figure 3:
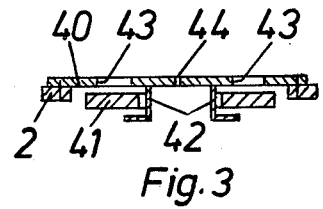

FIGS. 3–7 show designs which are alternatives to the one shown in FIG. 2. In FIG. 3 the supports 42 for the valve plate 41 are mounted on a mounting plate 40 which is connected with the wall 2. The mounting plate is provided with a thin venting hole 44 and a series of larger holes 43 which, during normal operation of the compressor, allow oil to flow down into the lower part of container 1.

Figure 4:
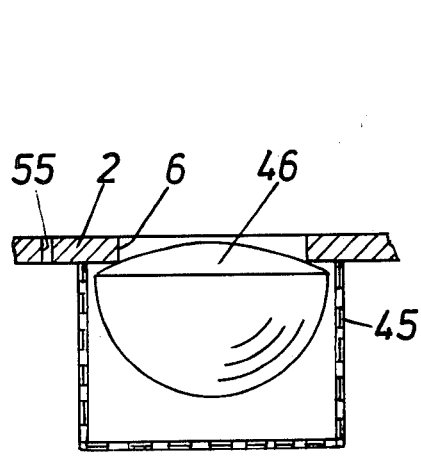

In the embodiment according to FIG. 4, the venting hole 55 is situated in the wall 2. The valve element is formed as a float 46 which is supported by a cage 45 of perforated sheet material.

Figure 5:
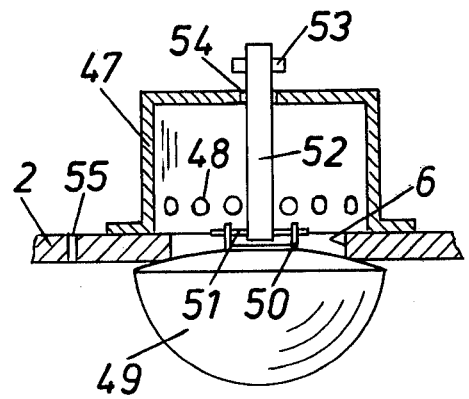

In the embodiment according to FIG. 5, a support 47 having holes 48 for passage of oil is mounted on the wall 2. The support also has a hole 54 for a shaft 52. The shaft is provided with a pin 53 which prevents the shaft 52 from falling through the hole 54. A float 49 is by means of a bracket 50 and a pin 51 connected to the shaft 52.

Figure 6:
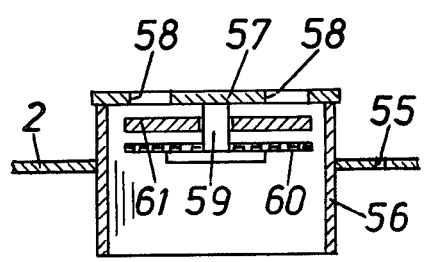

In the embodiment according to FIG. 6, a shell 56 has been mounted in the wall 2. The shell carries a mounting plate 57 which is provided with a series of holes 58 for the oil-flow and a support 59 which carries a plate 60 for supporting an elastic valve disc 61.

Figure 7:
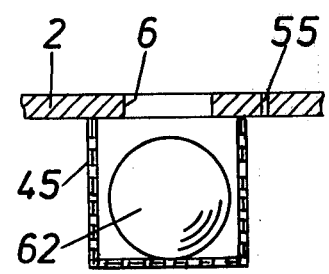

In the embodiment according to FIG. 7, the float 46 of FIG. 4 has been replaced by a ball 62.

The method according to the invention is in the embodiment shown in FIG. 1 exercised in the following way: compressed liquid-containing gas is introduced into the container 1 through conduit 10 eccentrically so that the main part of the liquid is separated in the first separator stage and collected on the bottom of the container 1. Then the gas, which still contains a substantial amount of liquid, is conducted through the filter unit 8, where substantially all the remaining liquid is separated. The liquid collected on the bottom of container 1 will be automatically prevented from reaching the filter unit 8 when the pressure therein decreases, i.e., when the compressor is shut down because valve plate 4 closes the hole 6 in wall 2, and then the lower part of container 1 is slowly depressurized through the bleeder hole 32.

The above described and in the drawings shown embodiments of the invention are only to be regarded as examples which can be modified within the scope of the appended claims.

What we claim is:

1. In the two-stage method of separating liquid from compressed air in liquid injected compressor systems and the like, in which the major portion of the liquid is removed from the compressed gas in the first stage by introducing the compressed air and liquid mixture eccentrically in a container, and collected under pressure in a bottom collection zone thereof, remaining liquid being removed in the second stage by passing the compressed air and residual liquid resulting from the first stage into a filter zone normally in communication with the bottom collection zone, the improvement preventing blowback of liquid collected in the first stage into the filter zone of the first stage, comprising:
   (a) sealing the pressurized liquid collected in the first stage from the compressed gas and residual liquid in the second stage when the pressure in the system falls below a predetermined value; and
   (b) gradually equalizing the pressure between the first stage and the second stage.

2. A device for separating liquid from liquid-containing compressed gas comprising a container having liquid collecting means, a conduit for supplying compressed liquid-containing gas to the container, said conduit being eccentrically connected to the container so that the container acts as a first stage cyclone separator for the liquid, a filter unit in said container acting as a second stage separator for the liquid, said second stage separator being in flow communication with said first stage separator, said container comprising wall means situated between the filter unit and the liquid collecting means, said wall means comprising a hole to allow liquid to flow through the wall means towards the liquid collecting means, valve means for automatically closing said hole when the pressure at the filter unit is lower than at the liquid collecting means so that collected liquid is automatically prevented from expanding into the filter unit, and a bleeder hole being provided for establishing a flow communication between the two sides of said wall means to allow the pressure at the liquid collecting means to slowly decrease to the pressure prevailing at the filter unit.

3. A device according to claim 2, in which the bleeder hole is provided in a tube on the wall means, said bleeder hole being directed away from the filter unit.

4. A device according to claim 2, in which said valve means comprises a valve plate.

5. A device according to claim 4, in which said valve plate is made of an elastic material.

6. A device according to claim 2, in which said valve means comprises a float.

7. A device according to claim 6, in which said float is a ball.

* * * * *